United States Patent
Metz

(10) Patent No.: US 7,503,361 B2
(45) Date of Patent: Mar. 17, 2009

(54) TIRE WITH TREAD HAVING TRANSVERSE GROOVES FORMING BLOCK FLANK SURFACES

(75) Inventor: Markus Metz, Neustadt (DE)

(73) Assignee: Continental Aktiengesellschaft, Hannover (DE)

( * ) Notice: Subject to any disclaimer, the term of this patent is extended or adjusted under 35 U.S.C. 154(b) by 187 days.

(21) Appl. No.: 11/088,751

(22) Filed: Mar. 25, 2005

(65) Prior Publication Data

US 2005/0217775 A1    Oct. 6, 2005

(30) Foreign Application Priority Data

Mar. 26, 2004    (EP) .................................. 04007320

(51) Int. Cl.
    *B60C 11/13*    (2006.01)
(52) U.S. Cl. ........................... 152/209.21; 152/209.24
(58) Field of Classification Search ............ 152/209.18, 152/209.21, 209.24, 209.28
    See application file for complete search history.

(56) References Cited

U.S. PATENT DOCUMENTS

| | | | | | |
|---|---|---|---|---|---|
| 4,258,691 A | * | 3/1981 | Nakayama | ............. | 152/209.15 |
| 4,796,683 A | * | 1/1989 | Kawabata et al. | ...... | 152/209.24 |
| 4,986,324 A | * | 1/1991 | Suzuki et al. | .......... | 152/209.28 |
| 5,127,455 A | * | 7/1992 | Remick | .................. | 152/209.24 |
| 6,531,012 B2 | * | 3/2003 | Ishiyama | .................. | 156/110.1 |
| 2002/0124922 A1 | | 9/2002 | Carra et al. | | |

FOREIGN PATENT DOCUMENTS

| | | | |
|---|---|---|---|
| EP | 602989 | * | 6/1994 |
| GB | 1549347 | * | 8/1979 |
| JP | 01-178006 | * | 7/1989 |
| JP | 11-059130 | * | 3/1999 |
| WO | 90/01117 | | 2/1990 |

* cited by examiner

*Primary Examiner*—Steven D Maki
(74) *Attorney, Agent, or Firm*—Greenblum & Bernstein, P.L.C.

(57) ABSTRACT

A tire includes a tread rubber having a positive profile formed by at least one circumferential groove. Wherein the transverse grooves extends into the positive profile from the circumferential groove to form block flank surfaces. Further, the transverse grooves have bending points at which a change of direction takes place at an obtuse angle. Further still, at least one block flank has at least three flank surfaces, wherein at least one of the flank surfaces is inclined and connected to an upper surface of the positive profile. The tire is a vehicle pneumatic tire. The instant abstract is neither intended to define the invention disclosed in this specification nor intended to limit the scope of the invention in any way.

4 Claims, 2 Drawing Sheets

TIRE WITH TREAD HAVING TRANSVERSE GROOVES FORMING BLOCK FLANK SURFACES

CROSS-REFERENCE TO RELATED APPLICATIONS

The present application claims priority under 35 U.S.C. §119 of European Patent Application No. 04 007 320.7, filed on Mar. 26, 2004, the disclosure of which is expressly incorporated by reference herein in its entirety.

BACKGROUND OF THE INVENTION

1. Field of the Invention

The invention relates to a vehicle pneumatic tire with a tread rubber with a profile which features positive profiles, such as profile blocks or tread rubber strips running in the circumferential direction, formed by circumferential grooves, transverse grooves and the like. The transverse grooves are equipped with a bending point at which a change of direction takes place at an obtuse angle.

2. Discussion of Background Information

Vehicle pneumatic tires with tread rubber profiles with strip and/or with block structures are known in various embodiment variants. For example, a tire is known from EP-A-0 425 567 with a tread rubber profile embodied in a directional manner, which is composed of a number of block rows running in the circumferential direction.

It is further known that above all the braking properties of a tire on a dry surface can be influenced by the stiffness of the tread rubber in the longitudinal direction. In order to improve the braking properties on a dry surface, it is therefore advantageous to provide tread rubber strips or to embody the blocks in block rows in the circumferential direction as long as possible. The embodiment of the transverse grooves also plays a certain part, it is thus advantageous for the circumferential stiffening of blocks not to have the transverse grooves run straight, but to provide them with a bending point in their course.

SUMMARY OF THE INVENTION

The invention reinforces tread rubber profiles provided with transverse grooves in a targeted manner in the circumferential direction.

According to the invention, transverse grooves are limited by at least one flank comprising at least three flank surfaces. At least one of the flank surfaces is an inclined surface connecting to the block upper surface, and the inclined surface is embodied radially above the bending point of the transverse groove.

In this way the block flanks limiting the transverse grooves can be reinforced in a particularly advantageous manner in particular through the possibility of the mutual support of the flank surfaces so that the "statics" of the profile block in the tire circumferential direction can be influenced in the desired manner.

According to an advantageous embodiment of the invention, the block flank provided with a recessed bending point has four flank surfaces, two of which are inclined surfaces connecting to the block upper surface and two are surfaces connecting to the groove base and running at least essentially in the radial direction and separated from one another by the bending point. Two inclined surfaces can be advantageously arranged on a block flank with a recessed bending point.

A particularly favorable mutual support and "interconnection" of the block flank surfaces involved results when the inclined surfaces run at different angles to the radial direction and when one of the two inclined surfaces features an elongated triangular form, whereby the corner area featuring the smallest angle projects over the bending point.

A particularly favorable mutual support is favored in that the other inclined surface preferably features a rectangular form and has a limiting edge which runs from the block inside corner of the triangular inclined surface to the upper end of the bending point.

For an optimal stabilization and reinforcement of the block in the circumferential direction, the size of the angle of the two inclined surfaces to the radial direction plays a certain part. It is particularly favorable if the angle that encloses the triangular inclined surface with the radial direction is 20° to 70° and is greater than the angle that encloses the other surface with the radial direction.

The block flank with the projecting bending point can be designed in a particularly simple manner in that the block is reinforced or stabilized in the circumferential direction. To this end it is provided that this block flank features three flank surfaces, two of which run at least essentially in the radial direction, connect to the groove base and are separated from one another by the bending point, whereby the inclined surface runs radially outside the bending point, approximately in the center of the same.

A very good stabilization effect can already be achieved thereby with an inclined surface embodied in a triangular manner which can be embodied in a comparatively small-surface manner. It is thereby advantageous if the angle which encloses this inclined surface with the radial direction is selected to be between 30° and 85°.

According to another feature of the invention, the tire includes a tread rubber having a positive profile formed by at least one circumferential groove. Wherein the transverse grooves extends into the positive profile from the circumferential groove to form block flank surfaces. Further, the transverse grooves have bending points at which a change of direction takes place at an obtuse angle. Further still, at least one block flank has at least three flank surfaces, wherein at least one of the flank surfaces is inclined and connected to an upper surface of the positive profile.

According to another feature of the invention, the tire is a vehicle pneumatic tire.

Preferably, at least one flank surface is positioned radially above the bending point. Further, the block flank has at least four surfaces. Further still, the bending points form block flank surfaces having a recessed bending point, along with block flank surfaces including an extended bending point.

Preferably, the transverse groove has a groove base, and the flank surfaces include two inclined surfaces. Wherein the two inclined surfaces at least partially connect to the upper surface, and at least partially connect to the groove base. Further, the two flank surfaces connected to the groove base run at least approximately in the radial direction and are separated from one another by the bending point.

According to another feature of the invention, the two flank inclined surfaces are oriented at different angles to the radial direction. Wherein one of the two flank inclined surfaces is an elongated triangular shape, such that a corner area of the smallest angle of the triangular shape projects beyond the bending point. Further, the other inclined surface of the two flank inclined surfaces is a quadrangular shape. Further still, the quadrangular shape has a limiting edge connecting the corner area of the smallest angle of the triangular shape of the inclined flank surface to an upper end of the bending point.

Wherein the inclined flank surface having the triangular shape is inclined approximately 20° to 70° with respect to the radial direction. Further, the other inclined flank surface having the quadrangular shape is inclined less than the angle of the inclined flank surface having the triangular shape with respect with the radial direction.

According to another feature of the invention, the block flank has a projecting bending point, wherein at least partially the flank surfaces are separated by the bending point. Further, at least partially two of the flank surfaces are essentially oriented in the radial direction to connect to a base of the transverse groove.

Preferably, the inclined flank surface is triangular shaped. Further, the inclined flank surface having the triangular shape is oriented approximately 30° to 85° with respect with the radial direction.

Preferably, the positive profile comprises at least one of a tread rubber strip and blocks in a block row.

According to another feature of the invention, the tire includes a tread rubber having a positive profile formed as at least one of a tread rubber strip and blocks in a block row formed by at least one circumferential groove. Further, two transverse grooves extending into the tread rubber strip from the circumferential groove, wherein the block flanks of the at least one block is formed by the transverse grooves. Further still, at least one block flank has at least one inclined flank surface. Wherein the transverse groove has a recessed bending point at which a change of direction takes place at an obtuse angle. Further, a stiffness of the tread rubber strip is influenced in the longitudinal direction. Further still, the tire is a vehicle pneumatic tire.

According to another feature of the invention, the tire includes a tread rubber having a positive profile including at least one tread rubber strip and blocks in a block row formed by at least one circumferential groove. Further, the transverse grooves extend into the at least one tread rubber strip and blocks from the circumferential groove. Further still, the transverse groove includes at least one block flank having at least two flank surfaces. Wherein the transverse groove has a bending point at which a change of direction takes place at an obtuse angle. Further, at least one flank surface is inclined with respect to the radial direction.

Preferably, the tire is a vehicle pneumatic tire. Further, the inclined flank surface connects to a block upper surface.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
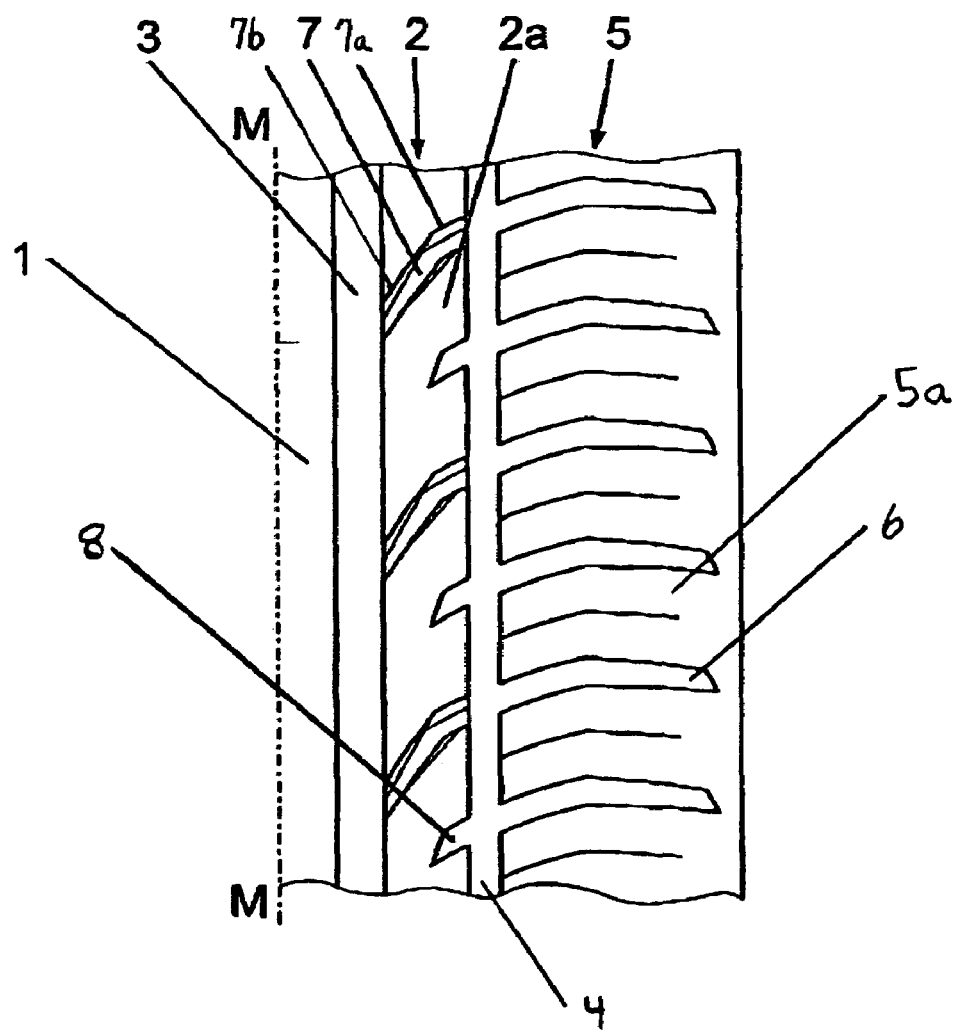
FIG. 1 A partial development of the one half of a profile of a tread rubber for a vehicle pneumatic tire, FIG. 2 A plan view of a transverse groove on a larger scale, FIG. 3 An oblique view of two consecutive blocks, and FIG. 4 An oblique view of the two blocks from FIG. 3 seen from the other direction.

FIG. 1 shows a profile for a tread rubber of a vehicle pneumatic tire for automobiles. The profile features a tread rubber strip 1 running along the equator line M-M, which tread rubber strip can be structured, e.g., by truncated grooves (not shown), and in the tread rubber half shown features two block rows 2, 5 which are separated from one another and from the central tread rubber strip 1 each by a wide circumferential groove 3, 4 running straight and in the circumferential direction. The second tread rubber half (not shown) can be embodied analogously but deviating therefrom. The shoulder block row 5 is subdivided by a plurality of transverse grooves 6 into blocks 5a. The block row 2 is also subdivided by transverse grooves 7 into blocks 2a, whereby in the embodiment shown the blocks 2a have a greater circumferential extension than the shoulder blocks 5a, since two shoulder blocks 5a correspond to one block 2a. The block row 2 has a block upper surface 2b (see FIG. 3). An additional subdivision or structuring of the blocks 2a is made by truncated grooves 8 which run from the circumferential groove 4 into the blocks 2a.

As defined by the invention, transverse grooves are understood to be those grooves that separate repetitive profile structures following one another in the circumferential direction from one another. Transverse grooves can therefore also run diagonally, i.e., at a comparatively small angle to the circumferential direction of the tire.

In the exemplary embodiment shown in FIG. 1, the transverse grooves 7 separating the block rows 2 into blocks 2a are bent at one point so that they are composed of two sections 7a, 7b, whereby the section 7b extends diagonally and the second section 7a runs more in the transverse direction. The bent course of the transverse grooves 7 can be followed on the basis of the course of their groove base 11. The angle between the two sections 7a, 7b is an obtuse angle in the order of magnitude of 120 to 175°. The transverse grooves 7 in the block row 2 are therefore respectively limited by a block flank 9 with a recessed bending point 16 and a block flank 10 with a projecting bending point 17.

Figure 2:
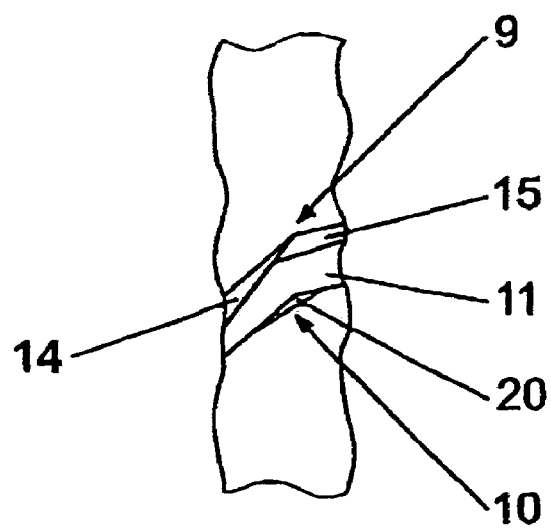

The special embodiment of block flanks 9, 10 is described in more detail below on the basis of FIGS. 2, 3 and 4. As shown in particular by FIG. 2, the block flank 9 is composed of four flank surfaces 12, 13, 14, 15. The flank surface 14 has a corner area 14a (see FIG. 3). The two flank surfaces 12, 13 connect to the groove base 11 and preferably run at the standard angle to the radial direction for groove flanks in the order of magnitude between 0 and 5°. The bending point 16 is a line running in the radial direction. The flank surface 13 is a quadrangle, in particular a rectangle or a trapezoid, with the bending point 16 as the basis. A triangular flank surface 14 connects to the flank surface 12 in the direction of the block surface, which flank surface 14 is an inclined surface running at an acute angle α in the order of magnitude of 20° and 70° to the radial direction. Inclined surface 14 extends as an elongated triangle beyond the bending point 16, so that the upper limiting edge of the flank surface 12, which at the same time is also the limiting edge of the flank surface 14, extends up to the block surface and projects over the bending point 16.

Figure 3:
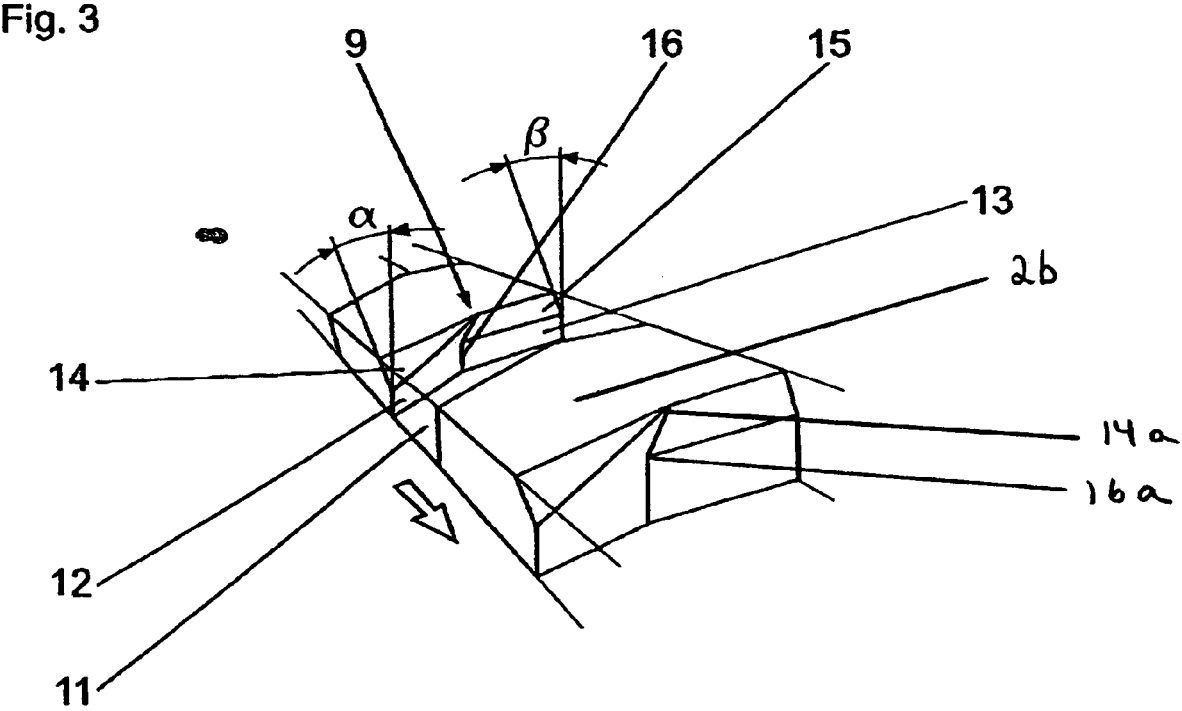

The bending point 16 has a upper bending point 16*a* (see FIG. 3). The block flank 9 is completed by the fourth flank surface 15 which is a quadrangle which is also an inclined surface which runs at an angle β to the radial which angle is smaller than α. The flank surface 15 is thus positioned at the block flank 9 in the manner shown in that one of its limiting edges (the distance between the upper bending point 16*a* to the corner area 14*a* (see FIG. 3) of the flank surface 14) runs from the block inside corner of the triangular flank surface 14 to the upper end of the bending point 16. The mutual arrangement of the flank surfaces 12, 13, 14, 15 results in a particularly advantageous interlinking and mutual support of the flank surfaces 12 through 15, through which the stiffness of the profile block in the tire circumferential direction is influenced in a particularly favorable manner.

Figure 4:
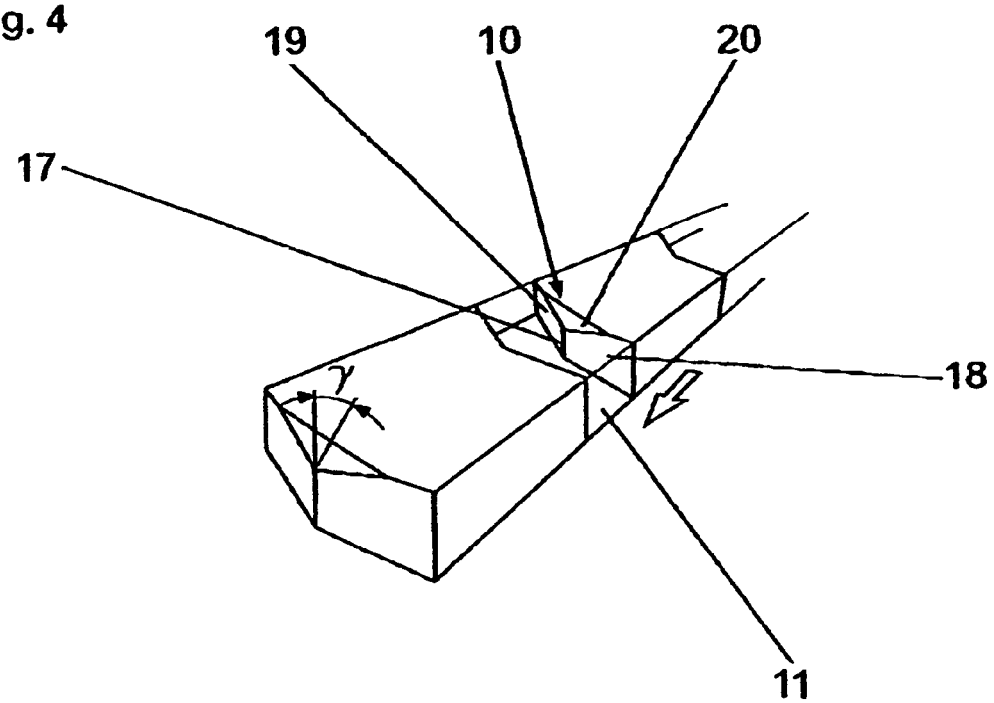

FIG. 4 shows a preferred embodiment of the block flank 10 with a projecting bending point 17. The block flank 10 has three flank surfaces 18, 19, 20, whereby the two flank surfaces 18, 19 connect to the groove base 11 and preferably run at an angle of 0° to 5° to the radial direction in the standard manner. The block is tapered by the third triangular flank surface 20 above the bending point 17. The triangular inclined flank surface 20 is inclined at an angle γ in the order of magnitude of 30 to 85° with respect to the radial direction. The triangular shape of the surface 20 results from the projecting bending point 17. The flank surface 20 can extend up to the circumferential grooves or, as shown, end within the groove sections 7*a*, 7*b*. It is further possible to taper the block 2*a* in a larger-area manner so that the resulting inclined surface becomes a pentagon.

The invention is not restricted to the embodiments shown. It is thus possible to embody only the recessed or only the projecting block flank according to the invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A tire comprising:
a tread rubber having a positive profile formed by at least one circumferential groove;
transverse grooves extending into said positive profile from said circumferential groove to form block flank surfaces;
said transverse grooves having bending points at which a change of direction takes place at an obtuse angle;
at least one block flank having at least four flank surfaces, wherein at least one of said flank surfaces is inclined and connected to an upper surface of said positive profile;
said transverse groove having a groove base,
wherein said flank surfaces include two inclined surfaces at least partially connecting said upper surface to two flank surfaces at least partially connected to said groove base, and
wherein one of said two flank inclined surfaces is an elongated triangular shape, such that a corner area of the smallest angle of said triangular shape projects beyond said bending point.

2. A tire in accordance with claim 1, wherein the other inclined surface of said two flank inclined surfaces is a quadrangular shape, wherein said quadrangular shape has a limiting edge connecting the corner area of the smallest angle of said triangular shape of said inclined flank surface to an upper end of said bending point.

3. A tire in accordance with claim 1, wherein said inclined flank surface having said triangular shape is inclined approximately 20° to 70° with respect to the radial direction.

4. A tire in accordance with claim 2, wherein said other inclined flank surface having said quadrangular shape is inclined less than the angle of said inclined flank surface having said triangular shape with respect with the radial direction.

* * * * *